United States Patent [19]

Gay et al.

[11] 4,101,251

[45] Jul. 18, 1978

[54] HYDRAULIC CONDUIT HAVING PIVOTING AND TELESCOPING CAPABILITY

[75] Inventors: Arthur D. Gay, Decatur; Derald L. Hartley, Mount Zion; William H. Klekamp, Decatur, all of Ill.

[73] Assignee: Caterpillar Tractor Co., Peoria, Ill.

[21] Appl. No.: 671,651

[22] Filed: Mar. 29, 1976

[51] Int. Cl.² .................................. F04B 39/14
[52] U.S. Cl. .................................. 417/313; 285/45; 285/302; 417/360
[58] Field of Search .......... 417/360, 313, 572, 53; 285/62, 45, 302, 231, 233; 137/565; 60/477, DIG. 10; 92/128; 74/18.2

[56] References Cited

U.S. PATENT DOCUMENTS

| 470,153 | 3/1892 | Dorward | 285/45 X |
|---|---|---|---|
| 2,047,330 | 7/1936 | Petersen | 417/360 |
| 2,655,870 | 10/1953 | Yohpe | 92/128 X |
| 2,904,769 | 9/1959 | Sampson et al. | 285/45 X |
| 2,990,778 | 7/1961 | Deters | 137/565 X |
| 3,290,064 | 12/1966 | Bush | 285/45 |
| 3,296,361 | 1/1967 | Markland et al. | 285/302 X |
| 3,347,566 | 10/1967 | Nelson | 285/45 X |
| 3,370,870 | 2/1968 | Mahoff | 285/233 |
| 3,475,039 | 10/1969 | Ortloff | 285/45 |
| 3,596,934 | 8/1971 | DeCenzo | 285/233 X |
| 3,765,807 | 10/1973 | Joyce | 60/477 X |
| 3,776,579 | 12/1973 | Gale | 285/233 |

FOREIGN PATENT DOCUMENTS

| 217,347 | 6/1924 | United Kingdom | 285/45 |
|---|---|---|---|
| 969,273 | 9/1964 | United Kingdom | 285/302 |

Primary Examiner—Carlton R. Croyl
Assistant Examiner—Edward Look
Attorney, Agent, or Firm—Phillips, Moore, Weissenberger, Lempio & Majestic

[57] ABSTRACT

Conduit means interconnect a hydraulic pump and a tank, the pump in turn being drivingly connected with a transmission. The conduit means include first and second conduits in telescoping and sealing relation which allows a degree of misalignment of one conduit relative to another, and allows one conduit to be pivoted about the longitudinal axis of the other.

7 Claims, 5 Drawing Figures

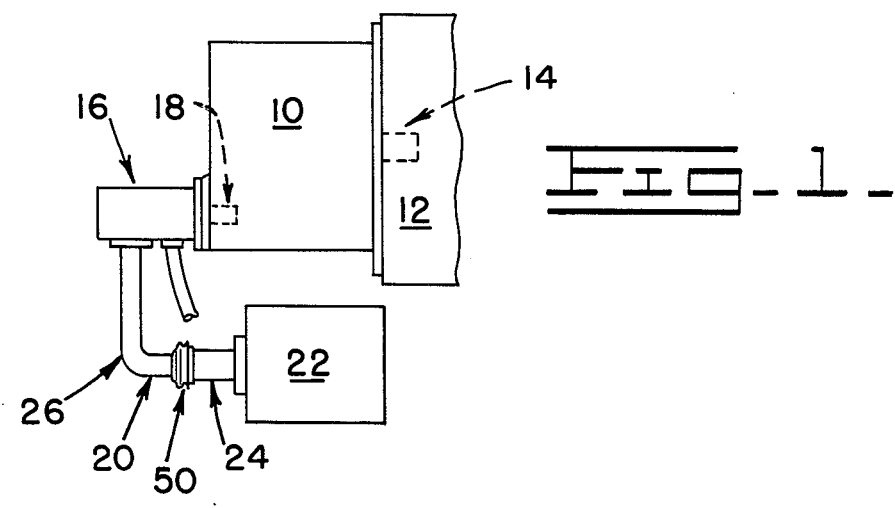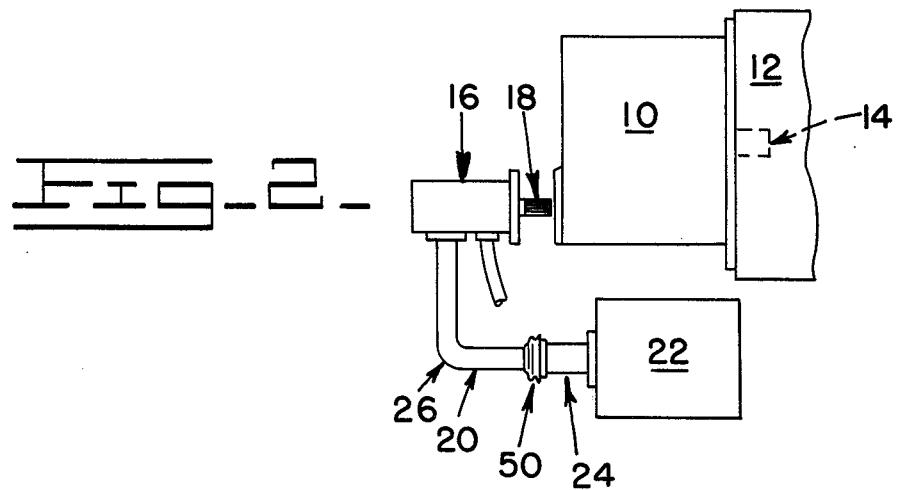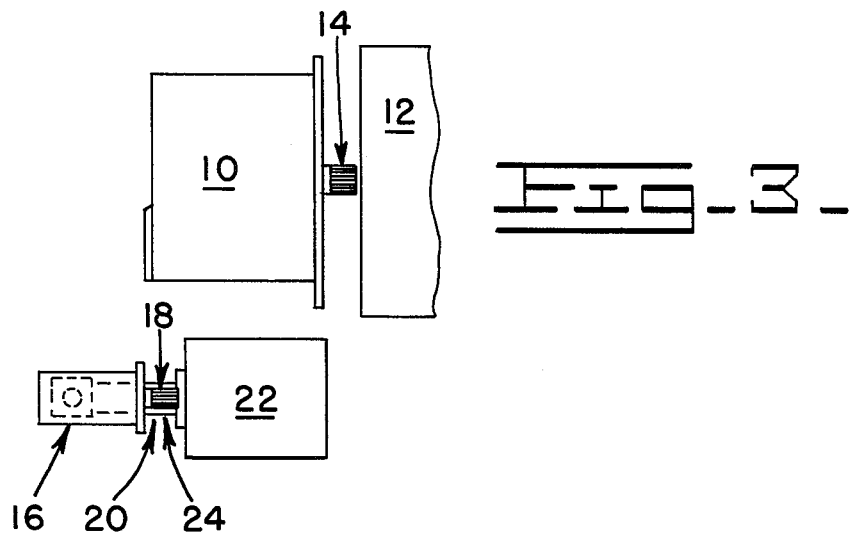

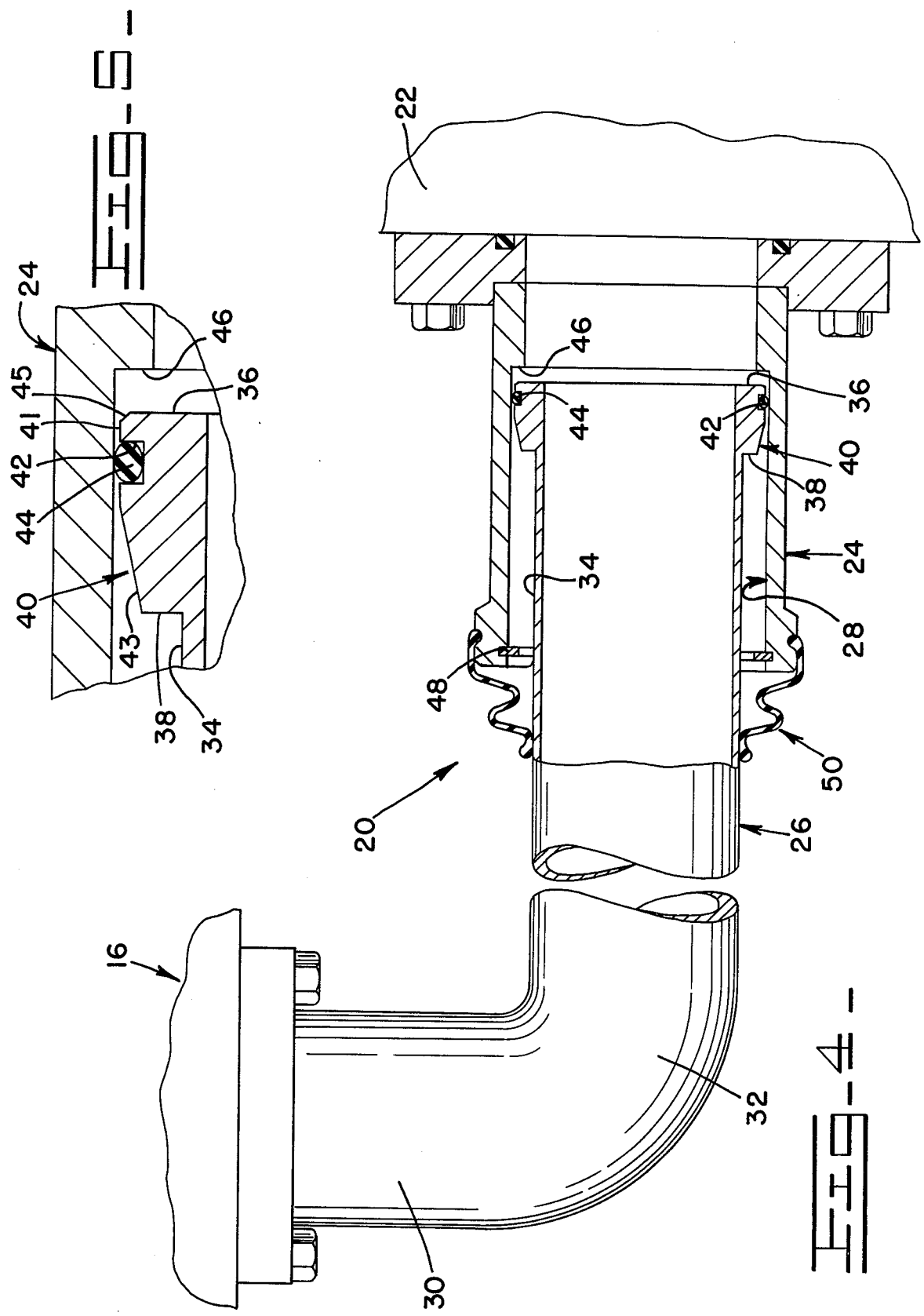

4,101,251

HYDRAULIC CONDUIT HAVING PIVOTING AND TELESCOPING CAPABILITY

BACKGROUND OF THE INVENTION

This invention relates to piping and pipe couplings, and more particularly, to a coupling between two conduits which allows for telescoping motion thereof and relative pivotal motion therebetween.

In a typical design, the transmission of a vehicle is secured to a vehicle frame, and a pump is drivingly secured to the transmission. Conduit means interconnect a hydraulic tank and the pump. Depending on the positioning of the pump in relation to the transmission, and depending on the configuration of the conduit means interconnecting the pump and the tank, in order to remove the vehicle transmission it may be necessary to break certain hydraulic connections in the system, which may allow contaminants into the system, and necessitate later bleeding of the system. This is particularly true when the transmission is so situated that the pump must initially be removed therefrom and relocated relative thereto, to allow subsequent removal of the transmission from the vehicle.

It will therefore be understood that the conduit means interconnecting the hydraulic tank and pump will, with advantage, provide for a number of degrees of motion of the pump relative to the transmission and tank, without the breaking of any hydraulic connections in the system.

Reference is made to U.S. Pat. No. 3,353,848 to Bleasby, wherein pipes are connected in such a manner as to allow a degree of misalignment thereof, but it will be seen that no telescoping relation of the pipes exist. U.S. Pat. Nos. 3,585,903 to Parrett, and 3,605,563 to Parrett disclose systems wherein conduits are in telescoping relation, but without any allowance for misalignment. U.S. Pat. Nos. 3,653,695 to Dunton et al, and 3,825,287 to Erickson et al (assigned to the assignee of this invention) disclose systems wherein a slight degree of misalignment may be tolerated between a pair of conduits, but only through seal deformation, resulting in a less than completely-efficient sealing system for the conduits.

SUMMARY OF THE INVENTION

It is accordingly an object of this invention to provide conduit means which provide for various degrees of motion between two elements interconnected by the conduit means.

It is a further object to provide conduit means which, while fulfilling the above object, include first and second conduits with proper sealing relation therebetween under any of the variety of the degrees of motion provided.

It is a still further object of this invention to provide conduit means which, while fulfilling the above objects, is extremely simple in design and effective in use.

It is a further object of this invention to provide a method of providing access to a transmission of a vehicle, which method is extremely effective in practice and allows proper access to the transmission of the vehicle for removal thereof from the vehicle.

Broadly stated, the invention comprises coupling apparatus comprising a first conduit defining an inner cylindrical surface, and a second conduit extending within the first conduit and defining a protruding surface portion therewithin in close proximity to the inner cylindrical surface of the first conduit. The first and second conduits are in telescoping inward and outward relation, with the protruding surface portion in close proximity to the inner cylindrical surface of the first conduit. The protruding surface portion is shaped to allow for a degree of misalignment of the second conduit relative to the first conduit.

Broadly stated, the invention comprises a method of providing access to a transmission of a vehicle comprising moving a pump away from the transmission along spline means drivingly interconnecting the pump and the transmission. Movement of the pump away from the transmission provides telescoping movement of first and second conduits, the first conduit being fixed relative to a tank and the second conduit being fixed relative to the pump. The pump and second conduit are then pivoted together away from the transmission about the longitudinal axis of the portion of the first conduit.

BRIEF DESCRIPTION OF THE DRAWINGS

These and other objects of the invention will become apparent from a study of the following specification and the drawings, in which:

FIG. 1 is a plan view of the conduit means in combination with a pump, a hydraulic tank and a transmission, with the pump secured to the transmission, and the transmission secured to the vehicle frame;

FIG. 2 is a view similar to that shown in FIG. 1, but with the pump removed from the transmission;

FIG. 3 is a view similar to that shown in FIG. 2 but with the pump moved laterally of the transmission, and the transmission removed from the vehicle frame;

FIG. 4 is a sectional view of the conduit means utilized in FIGS. 1-3; and

FIG. 5 is an enlarged view of a portion of the apparatus shown in FIG. 4.

DESCRIPTION OF THE PREFERRED EMBODIMENT

Shown in FIG. 1 is a transmission 10 secured to a vehicle frame 12 and drivingly connected to appropriate parts through spline means 14. Secured in turn to the transmission 10 on the side thereof away from the spline means 14 is a hydraulic pump 16, drivingly connected with the transmission 10 by spline means 18. Conduit means 20 interconnect the pump 16 and a hydraulic tank 22, as is generally well known. The conduit means 20 are shown in detail in FIGS. 4 and 5.

As shown therein, the conduit means 20 interconnecting the pump 16 and tank 22 include a first conduit 24, the hydraulic tank 22 being secured to and communicating with the first conduit 24, and a second conduit 26, the pump 16 being secured to and communicating with the second conduit 26. The first conduit 24 is generally tubular in configuration, and defines an inner cylindrical suface 28. The second conduit 26 includes a lateral portion 30 extending from the pump 16, a curved portion 32, and a further extending portion 34 which extends within the first conduit 24. The longitudinal axis of the first conduit 24 and the longitudinal axis of the extending portion 34 of the second conduit 26 are generally coincident, it will be seen.

The extending portion 34 of the second conduit 26 defines first and second radial, oppositely-facing shoulders 36, 38, and a protruding surface portion 40 thereabout and interconnecting the first and second shoulders 36, 38. The protruding surface portion 40 is made up of a cylindrical middle portion 41, a frustoconical surface portion 43 on one side of the portion 41 and angled inwardly away from the surface 28 in a direction away from the portion 41, and a frustoconical surface portion 45 on the other side of the portion 41 and angled inwardly away from the surface 28 in a direction away from the portion 41. The middle surface portion 41 defines an annular channel 42, in which is disposed an annular seal 44, such seal 44 being in sealing engagement with the inner surface 28 of the first conduit 24 with the protruding surface portion 40 in close proximity to the inner cylindrical surface 28 of the first conduit 24. It will be seen that the first and second conduits 24, 26 are in telescoping inward and outward relation, with the protruding surface portion 40 remaining in close proximity to the inner cylindrical surface 28 of the first conduit 24, to thereby provide continued sealing between the first and second conduits 24, 26 upon such telescoping movement. It will also be seen that the surface portion 40 allows for a degree of misalignment of the second conduit 26 relative to the first conduit 24, i.e. allows the longitudinal axis of the conduit portion 34 to be slightly skewed relative to the longitudinal axis of the conduit 24, with sealing relation between the conduits 24, 26 remaining in effect.

It should be understood that for this purpose, the protruding surface portion 40 could, for example, be of spherical configuration without altering these operating characteristics.

The telescoping movement of the first and second conduits 24, 26 inwardly is limited by the shoulder 36 defined by the conduit 26 contacting a shoulder 46 defined by the first conduit 24, which is positioned to be contacted by the shoulder 36 defined by the second conduit 26 upon extreme inward movement thereof. The telescopic movement of the first and second conduits 24, 26 relatively outwardly is limited by the shoulder 38 defined by the second conduit 26 contacting a retaining ring 48 mounted within the first conduit 24 adjacent the extending end of the first conduit 24. The ring 48 is contactable by the second conduit 26 to limit the extent of misalignment of the first and second conduits 24, 26.

It will be seen that the second conduit 26 if pivotable relative to the first conduit 24 generally about the longitudinal axis of the portion of the first conduit 24 surrounding the second conduit 26, i.e. in this embodiment, generally about the longitudinal axis of the first conduit 24.

A flexible elastomeric boot 50 is disposed about and in engagement with a portion of the first conduit 24, and is disposed about and in sliding engagement with the outer surface of the second conduit 26, so that the boot 50 interconnects the first and second conduits 24, 26 to exclude dirt from seal surfaces.

As will be seen in FIGS. 1-3, the pump 16 and first and second conduits 24, 26 are relatively positioned so that the spline means 18 drivingly connecting the pump 16 and transmission 10 are substantially parallel to the telescoping motion allowed between the first and second conduits 24, 26. Thus, upon release of the pump 16 from the transmission 10, outward telescoping movement of the second conduit 26 relative to the first conduit 24 provides for disengagement of the spline means 18. With the second conduit 26 being configured as described above, i.e. with the lateral portion 30, curved portion 32, and extending portion 24, pivoting of the second conduit 26 relative to the first conduit 24 generally about the longitudinal axis of the portion of the first conduit 24 surrounding the second conduit 26 moves the pump 16 laterally of the transmission 10 (FIG. 3).

Starting with the parts as shown in FIG. 1, access is provided to the transmission 10 of the vehicle so that the transmission 10 can be conveniently removed from the vehicle in the following manner. Initially, the pump 16 is detached from the transmission 10 and moved away from the transmission 10 along the spline means 18 drivingly interconnecting the pump 16 and transmission 10. The telescopic movement of the first and second conduits 24, 26 allowed as described above in turn allows for the disengagement of the spline means 18, it being rememberedthat such telescopic movement is allowed along a line appropriately positioned to allow disengagement of the spline means 18, as described above. The pump 16 and second conduit 24 are then pivoted together away from the transmission 10 about the longitudinal axis of the first conduit 24. It will be understood that during such telescoping and pivoting, continuous sealing relation between the first and second conduits 24, 26 is maintained, with the weight of the pump 16 now actually being supported by the ring 48. The transmission 10 itself can then be removed from the vehicle frame 12, such transmission 10 now being easily accessible since the pump 16 has been moved laterally thereof, as shown in FIG. 3. It should also be remembered that even with a degree of misalignment between the conduits 24, 26 existing, whether the pump 16 is secured to the transmission 10 or not, continuous sealing relation between the first and second conduits 24, 26 exists. Thus, manufacturing tolerances between, for example, the tank 22 and transmission 10 can be increased, since the conduit means allow for a significantly greater misalignment of their components than the prior systems.

What is claimed is:

1. Coupling apparatus comprising: a first conduit defining an inner cylindrical surface; a second conduit extending within the first conduit and defining a protruding surface portion thereabout in close proximity to the inner cylindrical surface of the first conduit; the first and second conduits being in telescoping inward and outward relation, with the protruding surface portion in close proximity to the inner cylindrical surface of the first conduit; and the protruding surface portion being shaped to allow for a degree of misalignment of the second conduit relative to the first conduit; and further comprising flexible boot means disposed about an in engagement with a portion of the first conduit, and disposed about and in engagement with a portion of the second conduit, whereby the flexible boot means interconnect the first and second conduits, and wherein the flexible boot means is in sliding engagement with the outer surface of the portion of the second conduit, and wherein the flexible boot means is secured relative to the first conduit.

2. The apparatus of claim 1 and further comprising an annular seal disposed in an annular channel defined by the protruding surface portion, said seal in sealing engagement with the inner cylindrical surface of the first conduit and further providing sealing upon a degree of misalignment of the first and second conduits.

3. Coupling apparatus of claim 1 further comprising stop means for limiting telescoping movement of the first and second conduits inwardly and outwardly; wherein the stop means comprise a shoulder defined by the first conduit and positioned to be contacted by a first shoulder defined by the second conduit to limit telescoping inward movement of the first and second conduits, and a retaining ring mounted in an annular channel provided in the inner cylindrical surface of the first conduit and positioned to be contacted by a second shoulder defined by the second conduit to limit outward telescoping movement of the first and second conduits; wherein the retaining ring is contactable by the second conduit to limit the extent of misalignment of the first and second conduits.

4. Coupling apparatus comprising: a first conduit defining an inner cylindrical surface; a second conduit extending within the first conduit and defining a protruding surface portion thereabout in close proximity to the inner cylindrical surface of the first conduit; the first and second conduits being in telescoping inward and outward relation, with the protruding surface portion in close proximity to the inner cylindrical surface of the first conduit; and the protuding surface portion being shaped to allow for a degree of misalignment of the second conduit relative to the first conduit; wherein the second conduit is pivotable relative to the first conduit generally about the longitudinal axis of a portion of the first conduit surrounding the second conduit; and further comprising a hydraulic tank secured to the first conduit, and a hydraulic pump secured to the second conduit, the first and second conduits providing communication between the tank and pump; the apparatus further comprising transmission means, the pump being releasably securable to the transmission means, and drivingly connected thereto through spline means when so secured to the transmission means, the pump and first and second conduits being relatively positioned so that the spline means are substantially parallel to the telescoping movement allowed between the first and second conduits, so that outward telescoping movement of the second conduit relative to the first conduit provides for disengagement of the spline means, the second conduit being configured so that upon pivoting of the second conduit relative to the first conduit generally about the longitudinal axis of the portion of the first conduit surrounding the second conduit, the pump secured to the second conduit is moved laterally of the transmission means.

5. Coupling apparatus comprising: a first conduit defining an inner cylindrical surface; and second conduit extending within the first conduit and defining a protruding surface portion thereabout in close proximity to the inner cylindrical surface of the first conduit; the first and second conduits being in telescoping inward and outward relation, with the protruding surface portion in close proximity to the inner cylindrical surface of the first conduit; and the protruding surface portion being shaped to allow for a degree of misalignment of the second conduit relative to the first conduit; and further comprising stop means for limiting telescoping movement of the first and second conduits inwardly and outwardly; wherein the second conduit is pivotable relative to the first conduit generally about the longitudinal axis of a portion of the first conduit surrounding the second conduit and further comprising a hydraulic tank secured to the first conduit, and a hydraulic pump secured to the second conduit, the first and second conduits providing communication between the tank and pump; the apparatus further comprising transmission means, the pump being releasably securable to the transmission means, and drivingly connected thereto through spline means when so secured to the transmission means, the pump and first and second conduits being relatively positioned so that the spline means are substantially parallel to the telescoping movement allowed between the first and second conduits, so that outward telescoping movement of the second conduit relative to the first conduit provides for disengagement of the spline means, the second conduit being configured so that upon pivoting of the second conduit relative to the first conduit generally about the longitudinal axis of the portion of the first conduit surrounding the second conduit, the pump secured to the second conduit is moved laterally of the- transmission means.

6. A method of providing access to a transmission of a vehicle comprising:
  moving a pump away from the transmission along spline means drivingly interconnecting the pump and transmission;
  said movement of the pump away from the transmission providing telescoping movement of first and second conduits, the first conduit being fixed relative to a tank and the second conduit being fixed relative to the pump; and
  pivoting the pump and second coduit together away from the transmission about the longitudinal axis of a portion of the first conduit.

7. The method of claim 6 and further providing continuous sealing relation between the first and second conduits upon telescoping movement thereof and pivoting of the second conduit relative to the first conduit.

* * * * *